(12) United States Patent
Park et al.

(10) Patent No.: US 11,272,714 B2
(45) Date of Patent: Mar. 15, 2022

(54) **METHOD FOR PREPARING FUNCTIONAL INGREDIENT-CONTAINING KIMCHI CONTAINING *DENDROPANAX MORBIFERA* LEV. EXTRACT**

(71) Applicants: Ji Hwan Park, Yongin-si (KR); Ju Yeon Yu, Yongin-si (KR)

(72) Inventors: Ji Hwan Park, Yongin-si (KR); Ju Yeon Yu, Yongin-si (KR)

( * ) Notice: Subject to any disclaimer, the term of this patent is extended or adjusted under 35 U.S.C. 154(b) by 300 days.

(21) Appl. No.: 16/484,243

(22) PCT Filed: Feb. 16, 2017

(86) PCT No.: PCT/KR2017/001689
§ 371 (c)(1),
(2) Date: Aug. 7, 2019

(87) PCT Pub. No.: WO2018/151346
PCT Pub. Date: Aug. 23, 2018

(65) Prior Publication Data
US 2019/0350215 A1    Nov. 21, 2019

(51) Int. Cl.
*A23B 7/10* (2006.01)
*A23L 19/20* (2016.01)

(52) U.S. Cl.
CPC .............. *A23B 7/105* (2013.01); *A23L 19/20* (2016.08); *A23V 2002/00* (2013.01)

(58) Field of Classification Search
CPC ............ A23B 7/10; A23B 7/105; A23L 19/20
See application file for complete search history.

(56) References Cited

FOREIGN PATENT DOCUMENTS

| KR | 2002-0024116 A | 3/2002 |
| KR | 20040107853 A * | 12/2004 |
| KR | 20100101258 A * | 9/2010 |
| KR | 101344585 B1 * | 12/2013 |
| KR | 10-2014-0100117 A | 8/2014 |
| KR | 10-1485539 B1 | 1/2015 |
| KR | 20150132924 A * | 11/2015 |
| KR | 10-1671382 B1 | 11/2016 |

OTHER PUBLICATIONS

Translation of Baek_KR20040107853 (Year: 2004).*
Translation of Kim II_KR20150132924 (Year: 2015).*
Translation of Oh_KR101344585 (Year: 2013).*
Translation of Park_KR20100101258 (Year: 2010).*
Kim, H., Song, M., "Ethnomedicinal Practices for Treating Liver Disorders of Local Communities in the Southern Regions of Korea", 2013, Evidence-Based Complementary and Alternative Medicine, vol. 2013 (Year: 2013).*
International Search Report dated Jun. 15, 2017, issued in counterpart International Application No. PCT/KR2017/001689, with English translation (2 pages).

* cited by examiner

*Primary Examiner* — Jeffrey P Mornhinweg
*Assistant Examiner* — Kelly P Kershaw
(74) *Attorney, Agent, or Firm* — Westerman, Hattori, Daniels & Adrian, LLP

(57) ABSTRACT

According to a method of manufacturing kimchi of the present invention, there is provided high-quality kimchi which contains *Dendropanax morbifera* Lev. and one or more functional ingredients selected from among a dandelion, *Capsella bursa-pastoris*, *Kalopanax septemlobus*, *Cuscuta chinensis* Lamarck, and *Sambucus williamsii* var. *coreana* Nakai, so that an irritating odor is reduced, freshness is maintained over a long period of time, an improved mouthfeel is ensured, excessive fermentation caused by the occurrence of microorganisms is prevented, and storage stability is improved.

14 Claims, 1 Drawing Sheet

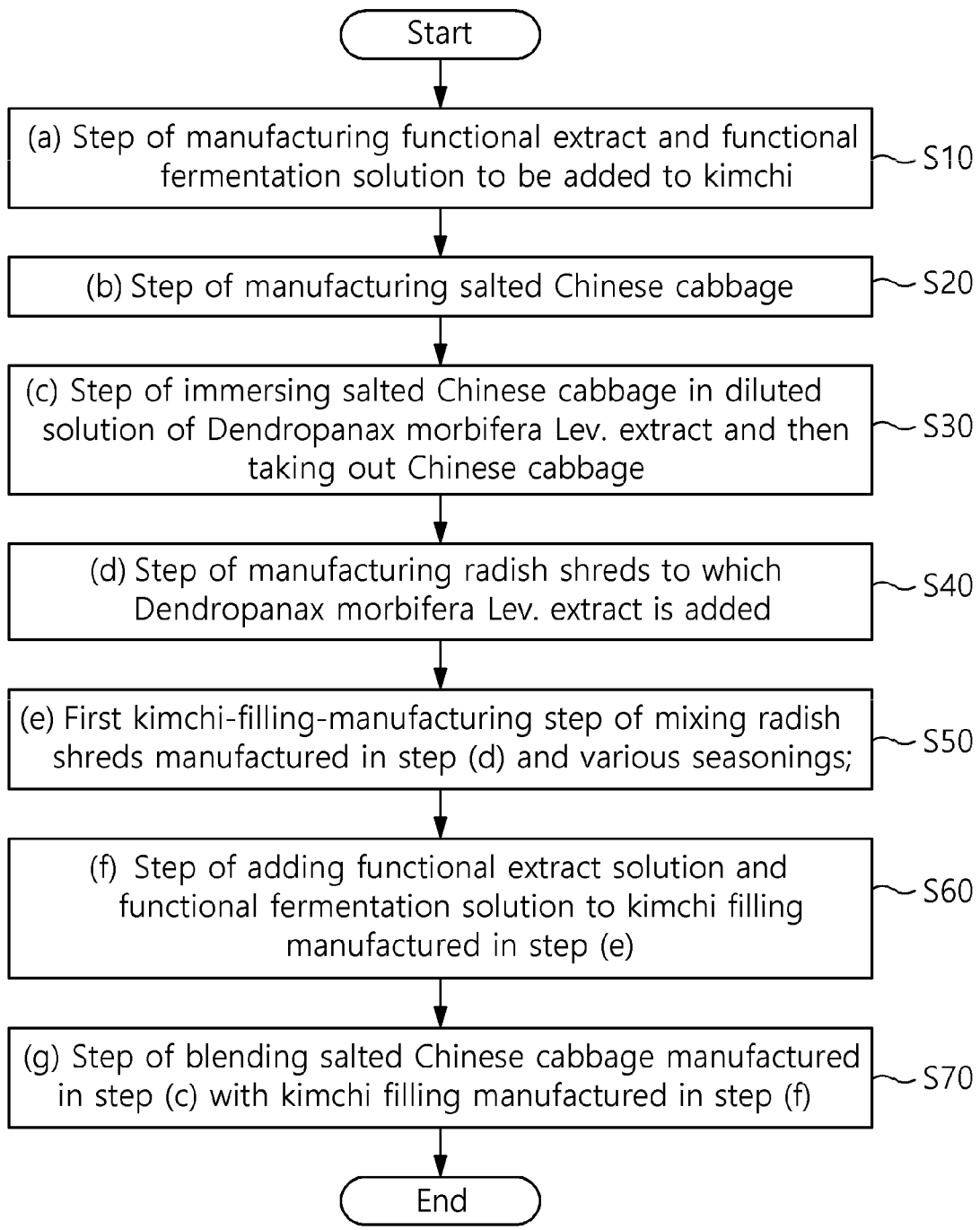

METHOD FOR PREPARING FUNCTIONAL INGREDIENT-CONTAINING KIMCHI CONTAINING *DENDROPANAX MORBIFERA* LEV. EXTRACT

TECHNICAL FIELD

The present invention relates to a method of manufacturing kimchi containing a *Dendropanax-morbifera*-Lev.-extract solution and functional ingredients. More particularly, the present invention relates to a method of manufacturing kimchi containing a *Dendropanax-morbifera*-Lev.-extract solution and one or more selected from among a dandelion, *Capsella bursa-pastoris*, *Kalopanax septemlobus*, *Cuscuta chinensis* Lamarck, and *Sambucus williamsii* var. *coreana* Nakai as functional ingredients.

BACKGROUND ART

*Dendropanax morbifera* Lev. is the only tree in the world that is native to the mountain forest of the southern beaches and islands in Korea and belongs to a Japanese angelica tree family, and has a height of 15 meters and evergreen broad leaves. The scientific name, *Dendropanax morbifera* Leu, is Latin for the ginseng tree referring to the panacea.

A benzoin from the sap of the *Dendropanax morbifera* Lev. is a name given to the effect of relaxing the human body and suppressing various nasty odors. Ben Cao Gang Mu (Compendium of Materia Medica) discloses that *Dendropanax morbifera* Lev. is effective in relieving fatigue, relieving menstrual irregularities in women, strengthening the kidneys and relieving arthralgia in men, and relieving children's sudden heart disease, abdominal pain, and astonishment when the *Dendropanax morbifera* Lev. is burned to offer incense. Further, according to modern medical science, *Dendropanax morbifera* Lev. has been found to be particularly effective in preventing dementia and treating strokes.

Further, the sap of *Dendropanax morbifera* Lev. has been cherished and used very limitedly since ancient times as a high-quality golden paint for painting various kinds of ornaments used in imperial families and formal suits of people who have made great achievements nationwide.

Meanwhile, kimchi, which is one of the representative fermented foods of Korea, has many advantages. However, the kimchi also has some disadvantageous problems to be solved, such as salting, which requires a lot of salt for storage stability, difficulty in maintaining freshness over a long period of time due to the rapid propagation of microorganisms during fermentation, the proliferation of *E. coli*, and the uniquely strong, irritating, and stinging odor of garlic in the conventional process of manufacturing kimchi.

Korean Laid-Open Patent Application No. 10-2014-0100117 is a patent application related to the present invention.

DISCLOSURE

Technical Problem

Accordingly, the present invention has been made keeping in mind the above problems occurring in the prior art, and an object of the present invention is to provide a method of manufacturing kimchi which contains new functional ingredients, so that an irritating odor is reduced, freshness is maintained over a long period of time, an improved mouthfeel is ensured, excessive fermentation caused by the occurrence of microorganisms is prevented, and storage stability is improved.

Another object of the present invention is to provide a method of manufacturing kimchi that contains new functional ingredients, thus having greatly increased content of nutritional ingredients, making it easy to digest and absorb the same.

Technical Solution

In order to accomplish the above objects, the present invention provides a method of manufacturing kimchi, the method including (a) manufacturing a *Dendropanax-morbifera*-Lev.-extract solution, a functional extract solution, and a functional fermentation solution to be added to the kimchi, the manufacturing step including the following processes ① to ③:

① selecting, cutting, and washing one or more of leaves, stems, branches, and roots of *Dendropanax morbifera* Lev., and adding the resulting substances together with water to a sap double boiler, followed by decocting at 70 to 120° C. for 5 to 100 hours to thus manufacture the *Dendropanax-morbifera*-Lev.-extract solution;

② adding one or more selected from among a dandelion, *Capsella bursa-pastoris*, *Kalopanax septemlobus*, *Cuscuta chinensis* Lamarck, and *Sambucus williamsii* var. *coreana* Nakai together with water to the sap double boiler, followed by decocting at 70 to 120° C. for 5 to 100 hours to thus manufacture the functional extract solution; and ③ mixing one or more selected from among the dandelion, the *Capsella bursa-pastoris*, the *Kalopanax septemlobus*, the *Cuscuta chinensis* Lamarck, and the *Sambucus williamsii* var. *coreana* Nakai with sugar at a weight ratio of 4:6 to 6:4, and adding 5 to 20 parts by weight of the *Dendropanax-morbifera*-Lev.-extract solution manufactured in the process ① based on 100 parts by weight of the mixture, followed by an aging process at a temperature condition of 1 to 10° C. for 1 to 6 months to thus manufacture the functional fermentation solution;

(b) salting a Chinese cabbage to manufacture a salted Chinese cabbage;

(c) immersing the salted Chinese cabbage manufactured in step (b) in a diluted solution of the *Dendropanax-morbifera*-Lev.-extract solution, manufactured using the *Dendropanax-morbifera*-Lev.-extract solution manufactured in step (a), and then taking out the Chinese cabbage;

(d) drying radish shreds, and uniformly spraying the diluted solution, which is manufactured using the *Dendropanax-morbifera*-Lev.-extract solution manufactured in the step (a), on the dried radish shreds, followed by drying to thus manufacture radish shreds to which the *Dendropanax-morbifera*-Lev.-extract solution is added;

(e) a first kimchi-filling-manufacturing step of mixing the radish shreds manufactured in step (d), the *Dendropanax-morbifera*-Lev.-extract solution manufactured in the step (a), garlic, ginger, Japanese apricot, red pepper powder, chives, salted seafood, and glutinous rice paste to manufacture a kimchi filling;

(f) a second kimchi-filling-manufacturing step of mixing 3 to 20 parts by weight of the functional extract solution and the functional fermentation solution manufactured in the step (a) with 100 parts by weight of the kimchi filling manufactured in step (e); and (g) blending the salted Chinese cabbage manufactured in step (c) with the kimchi filling manufactured in step (f).

Advantageous Effects

According to the method of manufacturing kimchi of the present invention, it is possible to provide high-quality kimchi which contains *Dendropanax morbifera* Lev. and one or more functional ingredients selected from among a dandelion, *Capsella bursa-pastoris, Kalopanax septemlobus, Cuscuta chinensis* Lamarck, and *Sambucus williamsii* var. *coreana* Nakai, so that an irritating odor is reduced, freshness is maintained over a long period of time, an improved mouthfeel is ensured, excessive fermentation caused by the occurrence of microorganisms is prevented, and storage stability is improved.

Further, it is possible to provide kimchi that contains the above-described functional ingredients, thus having greatly increased content of nutritional ingredients, making it easy to digest and absorb the same.

DESCRIPTION OF DRAWINGS

FIG. 1 is a flowchart showing the manufacturing steps of a method of manufacturing kimchi according to the present invention.

BEST MODE

Hereinafter, the present invention will be described in detail.

As shown in FIG. 1, the present invention relates to a method of manufacturing kimchi. The method includes:

manufacturing a *Dendropanax-morbifera*-Lev.-extract solution, a functional extract solution, and a functional fermentation solution to be added to the kimchi, the manufacturing step including the following processes ① to ③ (S10):

① selecting, cutting, and washing one or more of leaves, stems, branches, and roots of *Dendropanax morbifera* Lev., and adding the resulting substances together with water to a sap double boiler, followed by decocting at 70 to 120° C. for 5 to 100 hours to thus manufacture the *Dendropanax-morbifera*-Lev.-extract solution;

② adding one or more selected from among a dandelion, *Capsella bursa-pastoris, Kalopanax septemlobus, Cuscuta chinensis* Lamarck, and *Sambucus williamsii* var. *coreana* Nakai together with water to the sap double boiler, followed by decocting at 70 to 120° C. for 5 to 100 hours to thus manufacture the functional extract solution; and ③ mixing one or more selected from among the dandelion, the *Capsella bursa-pastoris*, the *Kalopanax septemlobus*, the *Cuscuta chinensis* Lamarck, and the *Sambucus williamsii* var. *coreana* Nakai with sugar at a weight ratio of 4:6 to 6:4, and adding 5 to 20 parts by weight of the *Dendropanax-morbifera*-Lev.-extract solution manufactured in the process ① based on 100 parts by weight of the mixture, followed by an aging process at a temperature condition of 1 to 10° C. for 1 to 6 months to thus manufacture the functional fermentation solution;

(b) salting a Chinese cabbage to manufacture a salted Chinese cabbage (S20);

(c) immersing the salted Chinese cabbage manufactured in step (b) in a diluted solution of the *Dendropanax-morbifera*-Lev.-extract solution manufactured using the *Dendropanax-morbifera*-Lev.-extract solution manufactured in step (a), and then taking out the Chinese cabbage (S30);

(d) drying radish shreds, and uniformly spraying the diluted solution, which is manufactured using the *Dendropanax-morbifera*-Lev.-extract solution manufactured in the step (a), on the dried radish shreds, followed by drying to thus manufacture radish shreds to which the *Dendropanax-morbifera*-Lev.-extract solution is added (S40);

(e) a first kimchi-filling-manufacturing step of mixing the radish shreds manufactured in step (d), the *Dendropanax-morbifera*-Lev.-extract solution manufactured in the step (a), garlic, ginger, Japanese apricot, red pepper powder, chives, salted seafood, and glutinous rice paste to manufacture a kimchi filling (S50);

(f) a second kimchi-filling-manufacturing step of mixing 3 to 20 parts by weight of the functional extract solution and the functional fermentation solution manufactured in the step (a) with 100 parts by weight of the kimchi filling manufactured in step (e) (S60); and (g) blending the salted Chinese cabbage manufactured in step (c) with a kimchi filling manufactured in step (f) (S70).

Hereinafter, the step (a) (S10) will be described in detail.

In the step (a), it is preferable to use *Dendropanax morbifera* Lev. that is ten or more years old because it is possible to obtain an extract solution having superior efficacy thereby. The size of the cut *Dendropanax morbifera* Lev. is not particularly limited. However, it may be preferable to cut the *Dendropanax morbifera* Lev. in the form of a rectangular hexahedron of 50 mm×15 mm×15 mm in width×length×height in order to extract the pharmacological ingredients.

Further, it may be preferable to use the cut *Dendropanax morbifera* Lev. after storing the same at a low temperature of 2 to 5° C. for 20 to 40 days. In the case of storing in the storage state as described above, evaporation and deodorization of useful water and various organic substances when exposed to room temperature for use may be prevented, which is preferable.

In the step (a), the functional extract solution and the functional fermentation solution may be manufactured using dandelion. Common dandelions include vitamins C, D, and A and vitamin B complexes, iron, calcium, and zinc. Dandelions also contain some flavonoid ingredients and terpenoids (active organic compounds, anti-cancer/anti-gastric ulcer/diuretic effects). Thus, dandelion increases urine production, improves kidney function, and helps improve liver function and blood circulation. Further, dandelion is capable of being used as a natural antioxidant to remove active oxygen in the body, thus helping to prevent aging. Further, the choline ingredient contained in dandelion helps to decompose fat and inhibits fat formation, thereby preventing the occurrence of fatty liver.

According to a study published in 'Life Science' by the Memorial Sloan Kettering Cancer Center in the United States, it has been reported that "the growth of malignant tumors and cultured cancer cells can be slowed in experiments using dandelion". This means that the dandelion extract solution can have anticancer properties.

In the step (a), the functional extract solution and the functional fermentation solution may be manufactured using *Capsella bursa-pastoris*. The *Capsella bursa-pastoris* helps to counteract the poison that has accumulated in the liver and to restore normal liver function. It contains a potassium ingredient, which helps to discharge sodium. *Capsella bursa-pastoris* benefits the stomach and thus is used as a digestive medicine and an antidiarrheal agent in oriental medicine. *Capsella bursa-pastoris* is used as a hematinic due to the hemostatic effect thereof, and contains a lot of vitamin A, thus having excellent efficacy in protecting and improving eyesight. The contents of calcium, phosphorus, vitamin A, β-carotene, and protein in the *Capsella bursa-pastoris* are significantly higher than those of other vegetables. Minerals, such as calcium, phosphorus, iron, and potassium, contained in the *Capsella bursa-pastoris* are not only essential nutrients for adults but also important nutrients, especially for children's body development and growth.

In the step (a), the functional extract solution and the functional fermentation solution may be manufactured using *Kalopanax septemlobus*. The branches, roots, and bark of *Kalopanax septemlobus* (fresh shoots of thorny tree) are frequently used as the materials of various health foods. The bark of *Kalopanax septemlobus* is also called Erythrina variegate, and *Kalopanax septemlobus* is used after the bark is removed therefrom. The bark of *Kalopanax septemlobus* is known to have an excellent effect on liver function recovery, liver cancer, liver cirrhosis, and hepatitis and also to have an effect on bronchial diseases to thus stop coughing and sputum discharge. Further, it is known that *Kalopanax septemlobus* has good efficacy in brain function activation, a tonic effect, and prevention of neuralgia, rheumatoid arthritis, and diabetes. Further, *Kalopanax septemlobus* improves blood circulation and has an anti-inflammatory effect to eliminate inflammation/pain, and repeated doses of *Kalopanax septemlobus* help to prevent strokes.

In the step (a), the functional extract solution may be manufactured using *Cuscuta chinensis* Lamarck. *Cuscuta chinensis* Lamarck is known as a medicinal ingredient that protects the liver and kidneys, brightens the eyes, activates yang energy, and strengthens the kidney function. It is effective in relieving impotence of a male whose kidney is weak, the case when semen flows unintentionally, and nocturnal emission. It also strengthens the bones, strengthens the waist, and heals throbbing pains and aches of the waste and knees due to poor kidney function. Moreover, it has been known to cure pollakisuria, a symptom of difficulty in urination, and diarrhea and to be effective in the treatment of diabetes. *Cuscuta chinensis* Lamarck is also used to treat anorexia, dry mouth, and thirst.

In the step (a), the functional extract solution may be manufactured using *Sambucus williamsii* var. *coreana* Nakai. The *Sambucus williamsii* var. *coreana* Nakai is the only known medicinal herb that increases the weight of the bones, and is also known to stop pain most quickly among natural medicinal herbs. Further, it is effective in improving skin beauty and removing fine wrinkles, and has particularly excellent efficacy on scalp itching (dandruff). It also helps blood circulation and is effective for preventing osteoporosis or diseases affecting women.

In the step (a), among the functional extract solutions and the functional fermentation solutions manufactured using one or more selected from among dandelion, *Capsella bursa-pastoris, Kalopanax septemlobus, Cuscuta chinensis* Lamarck, and *Sambucus williamsii* var. *coreana* Nakai, the functional extract solution and the functional fermentation solution to be added to the kimchi filling may be used in various types of combinations.

As exemplified above, for example, the functional extract solution and the functional fermentation solution manufactured using the same material may be used in combination.

Further, the functional extract solution and the functional fermentation solution manufactured using dandelion, *Capsella bursa-pastoris*, or *Kalopanax septemlobus*, and the functional extract solution and the functional fermentation solution manufactured using either one selected from among *Cuscuta chinensis* Lamarck and *Sambucus williamsii* var. *coreana* Nakai may be used in combination.

Further, the functional extract solution and the functional fermentation solution manufactured using all of dandelion, *Capsella bursa-pastoris, Kalopanax septemlobus, Cuscuta chinensis* Lamarck, and *Sambucus williamsii* var. *coreana* Nakai may be used in combination.

In the step (a), during the process of extracting *Dendropanax morbifera* Lev. and one or more selected from among dandelion, *Capsella bursa-pastoris, Kalopanax septemlobus, Cuscuta chinensis* Lamarck, and *Sambucus williamsii* var. *coreana* Nakai, water may be used at a weight ratio of 3 to 10 times, and more preferably 4 to 6 times, with respect to the target to be extracted.

In the step (b), the step of manufacturing the salted Chinese cabbage includes mixing clean water and bay salt to thus manufacture bay-salt water having a concentration of 12% to 14%, salting the Chinese cabbage for 10 to 18 hours using the bay-salt water, and washing the salted Chinese cabbage 1 to 5 times with flowing water, followed by dehydration (so that the salinity of the Chinese cabbage is 1.5 to 2.5 wt %).

In the step (c), in the step of the immersing the salted Chinese cabbage in the diluted solution of the *Dendropanax-morbifera*-Lev.-extract solution manufactured using the *Dendropanax-morbifera*-Lev.-extract solution manufactured in the step (a) and then taking out the Chinese cabbage, for example, the salted Chinese cabbage may be immersed in the diluted solution, which has a concentration of 0.05 to 10% (v/v) and which is obtained by mixing the *Dendropanax-morbifera*-Lev.-extract solution and water, for 10 minutes to 2 hours, and is then taken out. Through the above-described step, salt may be discharged from the salted Chinese cabbage to the outside and the *Dendropanax-morbifera*-Lev.-extract ingredient may permeate the Chinese cabbage, so that a coating layer is formed on the surface of the Chinese cabbage, thereby providing kimchi including low-salt kimchi and the *Dendropanax morbifera* Lev. ingredient sufficiently mixed with each other therein.

In the step (d), in the step of manufacturing the radish shreds to which the *Dendropanax-morbifera*-Lev.-extract solution is added, first, the shredded radish may be dried for 0.5 to 5 hours to manufacture the radish shreds. The diluted solution, which has a concentration of 0.05 to 10% (v/v) and which is obtained by mixing the *Dendropanax-morbifera*-Lev.-extract solution and water, may be uniformly sprayed on the radish shreds and dried to remove water from the surface of the radish shreds. Through the above-described step, the elasticity of the radish shreds may be enhanced to thus improve the mouthfeel and digestion.

In the step (e), for example, the first kimchi-filling-manufacturing step may be performed by mixing 3 to 20 parts by weight of the *Dendropanax-morbifera*-Lev.-extract solution manufactured in the step (a), 10 to 40 parts by weight of garlic, 5 to 20 parts by weight of ginger, 3 to 10 parts by weight of a Japanese-apricot-fermentation solution, 10 to 40 parts by weight of red pepper powder, 20 to 50 parts by weight of chives, 5 to 20 parts by weight of salted seafood, and 20 to 50 parts by weight of glutinous rice paste based on 100 parts by weight of the radish shreds manufactured in the step (d).

According to preference, one or more selected from the group consisting of green onion, water parsley, leek, leaf mustard, and green pepper may be further added to the kimchi filling. The ingredients may be contained in an amount of 10 to 100 parts by weight based on 100 parts by weight of the radish shreds.

In the step (f), the functional extract solution and the functional fermentation solution may be added at a weight ratio of 2:8 to 8:2.

In the step (g), the step of blending the salted Chinese cabbage with the kimchi filling manufactured in the step (f) may be performed using a method conventionally carried out in this field. For example, the kimchi filling may be added layer on layer to the salted Chinese cabbage.

In the method of manufacturing the kimchi according to the present invention, the garlic and the ginger included in the first kimchi-filling-manufacturing step in the step (e) may be added in the form of the *Dendropanax-morbifera*-Lev.-garlic-fermentation solution and the *Dendropanax-morbifera*-Lev.-ginger-fermentation solution manufactured through mixing with the *Dendropanax-morbifera*-Lev.-extract solution manufactured in the step (a). Further, the Japanese-apricot-fermentation solution may be a *Dendropanax-morbifera*-Lev.-Japanese-apricot-fermentation solution.

For example, 5 to 15 kg of the chopped garlic and 5 to 15 kg of the sugar may be mixed with 100 liters of the *Dendropanax-morbifera*-Lev.-extract solution and then stored at a temperature of 5 to 10° C. for 3 to 8 months, thus manufacturing the *Dendropanax-morbifera*-Lev.-garlic-fermentation solution.

For example, 5 to 15 kg of the chopped ginger and 5 to 15 kg of the sugar may be mixed with 100 liters of the *Dendropanax-morbifera*-Lev.-extract solution and then stored at a temperature of 5 to 10° C. for 3 to 8 months, thus manufacturing the *Dendropanax-morbifera*-Lev.-ginger-fermentation solution.

For example, 5 to 15 kg of Japanese apricot pulp and 5 to 15 kg of the sugar may be mixed with 100 liters of the *Dendropanax-morbifera*-Lev.-extract solution and then stored at a temperature of 5 to 10° C. for 3 to 8 months, thus manufacturing a *Dendropanax-morbifera*-Lev.-Japanese-apricot-fermentation solution.

The *Dendropanax-morbifera*-Lev.-garlic-fermentation solution provides ingredients such as potassium, sodium, and proteins contained in the garlic and beneficial functions such as anticancer, anti-aging, and detoxification functions. The *Dendropanax-morbifera*-Lev.-extract solution of the *Dendropanax-morbifera*-Lev.-garlic-fermentation solution serves to remove the irritating spicy taste and the peculiar pungent odor of garlic.

Further, ginger in the above-mentioned *Dendropanax-morbifera*-Lev.-ginger-fermentation solution contains diastase and proteolytic enzyme to promote intestinal motility and help relieve nausea and cure diarrhea. Ginger has strong bactericidal action against various pathogenic bacteria such as typhoid or cholera bacteria, thus having the ability to inhibit the proliferation of harmful entities such as microorganisms, viruses, pathogens, and *Escherichia coli*, in addition to the antimicrobial and antiviral efficacy of *Dendropanax morbifera* Lev.

Further, Japanese apricot in the above-mentioned *Dendropanax-morbifera*-Lev.-Japanese-apricot-fermentation solution has a high content of citric acid and thus is effective in relieving fatigue and preventing adult diseases. Japanese apricot helps to cure food poisoning, aids in digestion to thus cleanse the stomach, and changes an acidic constitution into an alkali constitution.

In the method of manufacturing the kimchi according to the present invention, the *Dendropanax-morbifera*-Lev.-fermentation solution may be manufactured using the following method, and may be used instead of the *Dendropanax-morbifera*-Lev.-extract solution manufactured in the step (a), or may be used while being mixed with the *Dendropanax-morbifera*-Lev.-extract solution at a ratio of 1:9 to 9:1.

The above-described procedure may be performed so that nutritional ingredients of the *Dendropanax-morbifera*-Lev.-extract solution and nutritional ingredients of the *Dendropanax-morbifera*-Lev.-fermentation solution are used selectively or in combination, which enables the taste and the nutrition of the kimchi to be further enriched.

The *Dendropanax-morbifera*-Lev.-fermentation solution may be manufactured using a method including the following processes:

① washing and then finely crushing fresh leaves of the *Dendropanax morbifera* Lev.;

② after washing the fresh leaves of the *Dendropanax morbifera* Lev., roasting the washed fresh leaves at a temperature of 80 to 100° C. for 0.5 to 2 hours and finely crushing the roasted leaves of the *Dendropanax morbifera* Lev.;

③ mixing the fresh leaves of the *Dendropanax morbifera* Lev. and the roasted leaves of the *Dendropanax morbifera* Lev. manufactured in the processes ① and ② at a weight ratio of 2:8 to 8:2, and further adding 20 to 300 parts by weight of the *Dendropanax-morbifera*-Lev.-extract solution manufactured in the same manner as in the step (a) based on 100 parts by weight of the mixture, thus manufacturing a *Dendropanax morbifera* Lev. mixture; and ④ adding 10 to 50 parts by weight of sugar to the *Dendropanax morbifera* Lev. mixture manufactured in the process ③ based on 100 parts by weight of the *Dendropanax morbifera* Lev. mixture, followed by aging and fermentation for 6 months to 3 years.

In the step ①, the aging and the fermentation may be performed at a temperature condition of 1 to 10° C. or at room temperature.

In the method of manufacturing the kimchi according to the present invention, the kimchi filling and the salted Chinese cabbage may be prepared simultaneously, the kimchi filling may be prepared after the salted Chinese cabbage is prepared, or the salted Chinese cabbage may be prepared after the kimchi filling is prepared.

In the method of manufacturing the kimchi according to the present invention, the contents of the technology known in this field may be applied to portions other than the technical features described above.

Mode for Invention

Hereinafter, the present invention will be described in more detail with reference to Examples. However, the following Examples are intended to further illustrate the present invention, and the scope of the present invention is not limited by the following Examples. The following Examples can be appropriately modified and changed by those skilled in the art within the scope of the present invention.

Preparation Example 1: Manufacture of *Dendropanax-morbifera*-Lev.-Extract Solution The *Dendropanax morbifera* Lev. was cut to a size of 50 mm×15 mm×15 mm, washed, and stored at a low temperature of 2 to 5° C. for 30 days.

1 kg of the *Dendropanax morbifera* Lev. was added together with 350 liters of water to a sap double boiler and decocted at a temperature of 105° C. for 72 hours or more, thus manufacturing a *Dendropanax-morbifera*-Lev.-extract solution.

Preparation Example 2: Manufacture of Water-Parsley-Extract Solution 10 kg of washed dandelion and 50 L of water were added to a sap double boiler and decocted at a temperature of 105° C. for 72 hours, thus manufacturing a dandelion extract solution.

Preparation Example 3: Manufacture of *Capsella-bursa-pastoris*-Extract Solution 10 kg of the washed *Capsella bursa-pastoris* and 50 L of water were added to a sap double boiler and decocted at a temperature of 105° C. for 72 hours, thus manufacturing a *Capsella-bursa-pastoris*-extract solution.

Preparation Example 4: Manufacture of *Kalopanax-septemlobus*-Extract Solution 10 kg of the *Kalopanax septemlobus*, cut to a size of 20 mm×20 mm×70 mm, and 50 L of water were added to a sap double boiler and decocted at a temperature of 105° C. for 72 hours, thus manufacturing a *Kalopanax-septemlobus*-extract solution.

Preparation Example 5: Manufacture of *Cuscuta-chinensis*-Lamarck-Extract Solution 10 kg of the washed *Cuscuta chinensis* Lamarck and 50 L of water were added to a sap double boiler and decocted at a temperature of 105° C. for 72 hours, thus manufacturing a *Cuscuta-chinensis*-Lamarck-extract solution.

Preparation Example 6: Manufacture of *Sambucus-williamsii*-var.-*coreana*-Nakai-Extract Solution 10 kg of the *Sambucus williamsii* var. *coreana* Nakai, cut to a size of 20 mm×20 mm×70 mm, and 50 L of water were added to a sap double boiler and decocted at a temperature of 105° C. for 72 hours, thus manufacturing a *Sambucus-williamsii*-var.-*coreana*-Nakai-extract solution.

Preparation Example 7: Manufacture of Water-Parsley-Fermentation Solution 10 kg of the washed dandelion was crushed and then added together with 10 kg of sugar and 2 L of the *Dendropanax-morbifera*-Lev.-extract solution manufactured in Preparation Example 1 to a pot, followed by aging at a temperature of 1 to 10° C. for 3 months, thus manufacturing a dandelion fermentation solution.

Preparation Example 8: Manufacture of *Capsella-bursa-pastoris*-Fermentation Solution 10 kg of the washed *Capsella bursa-pastoris* was crushed and then added together with 10 kg of sugar and 2 L of the *Dendropanax-morbifera*-Lev.-extract solution manufactured in Preparation Example 1 to a pot, followed by aging at a temperature of 1 to 10° C. for 3 months, thus manufacturing a *Capsella-bursa-pastoris*-fermentation solution.

Preparation Example 9: Manufacture of *Kalopanax-septemlobus*-Fermentation Solution 10 kg of the washed *Kalopanax septemlobus* was crushed and then added together with 10 kg of sugar and 2 L of the *Dendropanax-morbifera*-Lev.-extract solution manufactured in Preparation Example 1 to a pot, followed by aging at a temperature of 1 to 10° C. for 3 months, thus manufacturing a *Kalopanax-septemlobus*-fermentation solution.

Preparation Example 10: Manufacture of *Cuscuta-chinensis*-Lamarck-Fermentation Solution 10 kg of the washed *Cuscuta chinensis* Lamarck was crushed and then added together with 10 kg of sugar and 2 L of the *Dendropanax-morbifera*-Lev.-extract solution manufactured in Preparation Example 1 to a pot, followed by aging at a temperature of 1 to 10° C. for 3 months, thus manufacturing a *Cuscuta-chinensis*-Lamarck-fermentation solution.

Preparation Example 11: Manufacture of *Sambucus-williamsii*-var.-*coreana*-Nakai-Fermentation Solution 10 kg of the washed *Sambucus williamsii* var. *coreana* Nakai was crushed and then added together with 10 kg of sugar and 2 L of the *Dendropanax-morbifera*-Lev.-extract solution manufactured in Preparation Example 1 to a pot, followed by aging at a temperature of 1 to 10° C. for 3 months, thus manufacturing a *Sambucus-williamsii*-var.-*coreana*-Nakai-fermentation solution.

Example 1: Manufacture of Kimchi (Containing Dandelion)

Water and bay salt were sufficiently mixed to manufacture bay-salt water having a concentration of 12% to 14% (w/w). Chinese cabbage that was quartered was salted for 14 hours. The salted Chinese cabbage was washed with flowing water four times and then dehydrated, thus manufacturing 5 kg of a salted Chinese cabbage.

The radish that was shredded was dried with a low-temperature wind at 2 to 5° C. for 3 hours to manufacture radish shreds. The *Dendropanax-morbifera*-Lev.-extract solution manufactured in Preparation Example 1 was diluted with water to manufacture a diluted solution having a concentration of 0.1% (v/v), and the diluted solution was uniformly sprayed on the radish shreds. After the spraying of the diluted solution was completed, the radish shreds were dried with a low-temperature wind at 2 to 5° C. for 2 hours to remove water from the surface of the radish shreds, thus manufacturing *Dendropanax-morbifera*-Lev.-containing radish shreds.

50 g of the *Dendropanax-morbifera*-Lev.-extract solution manufactured in Preparation Example 1, 500 g of the radish shreds that were manufactured as described above, 200 g of chopped garlic, 80 g of ginger, 40 g of a Japanese-apricot-fermentation solution, 200 g of red pepper powder, 250 g of chives, 100 g of salted anchovies, 300 g of leaf mustard, and 250 g of glutinous rice paste were mixed to manufacture a first-step kimchi filling.

100 g of the dandelion extract solution manufactured in Preparation Example 2 and 100 g of the dandelion fermentation solution were added to the first-step kimchi filling, thus completing the kimchi filling.

The kimchi filling was blended with the salted Chinese cabbage that was manufactured above, thus completing the kimchi.

Example 2: Manufacture of Kimchi (Containing *Capsella bursa-pastoris*)

The kimchi was manufactured using the same method as in Example 1, except that a *Capsella-bursa-pastoris*-extract solution and a *Capsella-bursa-pastoris*-fermentation solution were used instead of the dandelion extract solution and the dandelion fermentation solution in Example 1.

Example 3: Manufacture of Kimchi (Containing *Kalopanax septemlobus*)

The kimchi was manufactured using the same method as in Example 1, except that a *Kalopanax-septemlobus*-extract solution and a *Kalopanax-septemlobus*-fermentation solution were used instead of the dandelion extract solution and the dandelion fermentation solution in Example 1.

Example 4: Manufacture of Kimchi (Containing *Cuscuta chinensis* Lamarck)

The kimchi was manufactured using the same method as in Example 1, except that a *Cuscuta-chinensis*-Lamarck-extract solution and a *Cuscuta-chinensis*-Lamarck-fermentation solution were used instead of the dandelion extract solution and the dandelion fermentation solution in Example 1.

Example 5: Manufacture of Kimchi (Containing *Sambucus williamsii* var. *coreana* Nakai)

The kimchi was manufactured using the same method as in Example 1, except that a *Sambucus-williamsii*-var.-*coreana*-Nakai-extract solution and a *Sambucus-williamsii*-var.-*coreana*-Nakai-fermentation solution were used instead of the dandelion extract solution and the dandelion fermentation solution in Example 1.

Example 6: Manufacture of Kimchi (Containing Dandelion and *Sambucus williamsii* var. *coreana* Nakai)

The kimchi was manufactured using the same method as in Example 1, except that 50 g of a dandelion extract solution, 50 g of a *Sambucus-williamsii*-var.-*coreana*-Nakai-extract solution, 50 g of a dandelion fermentation solution, and 50 g of a *Sambucus-williamsii*-var.-*coreana*-Nakai-fermentation solution were used instead of the dandelion extract solution and the dandelion fermentation solution in Example 1.

Example 7: Manufacture of Kimchi (Containing *Dendropanax-morbifera*-Lev.-Garlic-Fermentation Solution, *Dendropanax-morbifera*-Lev.-Ginger-Fermentation Solution, and *Dendropanax-morbifera*-Lev.-Japanese-Apricot-Fermentation Solution)

The kimchi was manufactured using the same method as in Example 1, except that a *Dendropanax-morbifera*-Lev.-garlic-fermentation solution, a *Dendropanax-morbifera*-Lev.-ginger-fermentation solution, and a *Dendropanax-morbifera*-Lev. Japanese-apricot-fermentation solution were used instead of the chopped garlic, the chopped ginger, and the Japanese-apricot-fermentation solution in Example 1, respectively.

Test Example: Sensory Evaluation of Kimchi Taste

Ten adult males and ten adult females were used as a subject group. A blind test was performed using the kimchi manufactured in Examples 1 to 7 and a commercially available kimchi (Chonggatjip Kimchi®) as a control group.

The subjects whose eyes were covered were induced to smell the kimchi of Examples 1 to 7 and the control group, and were asked to assign a score from 1 to 5. Also, the subjects were induced to taste the kimchi, and were asked to assign a score from 1 to 5. The average of these scores was obtained to evaluate the taste and smell of the kimchi of the Examples. The results are shown in Table 1 below.

TABLE 1

| | Taste evaluation score | Smell evaluation score |
| --- | --- | --- |
| Example 1 | 4.5 | 4.6 |
| Example 2 | 4.7 | 4.6 |
| Example 3 | 4.0 | 4.1 |
| Example 4 | 4.3 | 4.3 |
| Example 5 | 4.5 | 4.3 |
| Example 6 | 4.1 | 4.2 |
| Example 7 | 4.8 | 4.8 |
| Control group | 3.7 | 3.8 |

From the results shown in Table 1, it was confirmed that the kimchi of the present invention provided a taste and smell equal to or better than those of the commercially available kimchi even though it contains medicinal herb ingredients.

The invention claimed is:

1. A method of manufacturing kimchi, the method comprising:
   (a) manufacturing a functional extract solution, a functional fermentation solution, and at least one of a *Dendropanax-morbifera*-Lev.-extract solution and a *Dendropanax-morbifera*-Lev.-fermentation solution to be added to the kimchi, including following processes (1) to (3):
      (1) manufacturing at least one of the *Dendropanax-morbifera*-Lev.-extract solution and the *Dendropanax-morbifera*-Lev.-fermentation solution;
      (2) manufacturing the functional extract solution; and
      (3) manufacturing the functional fermentation solution;
   (b) salting a Chinese cabbage to manufacture a salted Chinese cabbage;
   (c) immersing the salted Chinese cabbage manufactured in step (b) in a diluted solution of the at least one of the *Dendropanax-morbifera*-Lev.-extract solution manufactured using the *Dendropanax-morbifera*-Lev.-extract solution and the *Dendropanax-morbifera*-Lev.-fermentation solution manufactured in step (a), and then taking out the Chinese cabbage;
   (d) manufacturing a kimchi filling using the functional fermentation solution and the at least one of the *Dendropanax-morbifera*-Lev.-extract solution and the *Dendropanax-morbifera*-Lev.-fermentation solution; and
   (e) blending the salted Chinese cabbage manufactured in step (c) with the kimchi filling manufactured in step (d), wherein the *Dendropanax-morbifera*-Lev.-fermentation solution in step (a) is manufactured using a method including processes of:
(1) washing and then finely crushing fresh leaves of the *Dendropanax morbifera* Lev.;
(2) after washing the fresh leaves of the *Dendropanax morbifera* Lev., roasting the washed fresh leaves at a temperature of 80 to 100° C. for 0.5 to 2 hours and finely crushing the roasted leaves of the *Dendropanax morbifera* Lev.;
(3) mixing the fresh leaves of the *Dendropanax morbifera* Lev. and the roasted leaves of the *Dendropanax morbifera* Lev. manufactured in processes (1) and (2) at a weight ratio of 2:8 to 8:2, and further adding 20 to 300 parts by weight of the *Dendropanax-morbifera*-Lev.-extract solution manufactured in a same manner as in the step (a) based on 100 parts by weight of a mixture, thus manufacturing a *Dendropanax morbifera* Lev. mixture, and
(4) adding 10 to 50 parts by weight of sugar to the *Dendropanax morbifera* Lev. mixture manufactured in process (3) based on 100 parts by weight of the *Dendropanax morbifera* Lev. mixture, followed by aging and fermentation for 6 months to 3 years; and
wherein the functional fermentation solution in step (a) is manufactured by mixing one or more selected from among a dandelion, *Capsella bursa-pastoris*, *Kalopanax septemlobus*, *Cuscuta chinensis* Lamarck, and *Sambucus williamsii* var. *coreana* Nakai with sugar at a weight ratio of 4:6 to 6:4, and adding 5 to 20 parts by weight of the at least one of the *Dendropanax-morbifera*-Lev.-extract solution and the *Dendropanax-morbifera*-Lev.-fermentation solution manufactured in process (1) based on 100 parts by weight of a mixture, followed by an aging process at a temperature condition of 1 to 10° C. for 1 to 6 months.

2. The method of manufacturing the kimchi according to claim 1, wherein the manufacturing the *Dendropanax-morbifera*-Lev.-extract solution in the step (a) is performed by selecting one or more of selecting, cutting, and washing one or more of leaves, stems, branches, and roots of *Dendropanax morbifera* Lev., and adding resulting substances together with water to a sap double boiler, followed by decocting at 70 to 120° C. for 5 to 100 hours.

3. The method of manufacturing the kimchi containing the *Dendropanax-morbifera*-Lev.-extract solution and functional ingredients according to claim 2, wherein the functional extract solution in the step (a) is manufactured by adding one or more selected from among the dandelion, the *Capsella bursa-pastoris*, the *Kalopanax septemlobus*, the *Cuscuta chinensis* Lamarck, and the *Sambucus williamsii* var. *coreana* Nakai together with water to the sap double boiler, followed by decocting at 70 to 120° C. for 5 to 100 hours.

4. The method of manufacturing the kimchi containing the *Dendropanax-morbifera*-Lev.-extract solution and the functional ingredients according to claim 3, wherein the manufacturing a kimchi filling in step (d) includes
(d-1) drying radish shreds, and uniformly spraying a diluted solution, which is manufactured using the *Dendropanax-morbifera*-Lev.-extract solution manufactured in the step (a), on the dried radish shreds, followed by drying to thus manufacture radish shreds to which the *Dendropanax-morbifera*-Lev.-extract solution is added;
(d-2) a first kimchi-filling-manufacturing step of mixing the radish shreds manufactured in step (d-1), the *Dendropanax-morbifera*-Lev.-extract solution manufactured in the step (a), garlic, ginger, Japanese apricot, red pepper powder, chives, salted seafood, and glutinous rice paste to manufacture the kimchi filling; and
(d-3) a second kimchi-filling-manufacturing step of mixing 3 to 20 parts by weight of a functional extract solution and the functional fermentation solution manufactured in the step (a) with 100 parts by weight of the kimchi filling manufactured in step (d-2).

5. The method of manufacturing the kimchi according to claim 4, wherein the functional extract solution and the functional fermentation solution are manufactured using the dandelion in the step (a).

6. The method of manufacturing the kimchi according to claim 4, wherein the functional extract solution and the functional fermentation solution are manufactured using the *Capsella bursa-pastoris* in the step (a).

7. The method of manufacturing the kimchi according to claim 4, wherein the functional extract solution and the functional fermentation solution are manufactured using the *Kalopanax septemlobus* in the step (a).

8. The method of manufacturing the kimchi according to claim 4, wherein the functional extract solution and the functional fermentation solution are manufactured using the *Cuscuta chinensis* Lamarck in the step (a).

9. The method of manufacturing the kimchi according to claim 4, wherein the functional extract solution and the functional fermentation solution are manufactured using the *Sambucus williamsii* var. *coreana* Nakai in the step (a).

10. The method of manufacturing the kimchi according to claim 4, wherein the functional extract solution and the functional fermentation solution are manufactured using any one selected from among the dandelion, the *Capsella bursa-pastoris*, and the *Kalopanax septemlobus* and one or more selected from among the *Cuscuta chinensis* Lamarck and the *Sambucus williamsii* var. *coreana* Nakai in the step (a).

11. The method of manufacturing the kimchi according to claim 4, wherein the functional extract solution and the functional fermentation solution are manufactured using the dandelion, the *Capsella bursa-pastoris*, the *Kalopanax septemlobus*, the *Cuscuta chinensis* Lamarck, and the *Sambucus williamsii* var. *coreana* Nakai in the step (a).

12. The method of manufacturing the kimchi according to claim 4, wherein the *Dendropanax-morbifera*-Lev.-extract solution is obtained by cutting and washing one or more selected from among the leaves, the stems, the branches, and the roots of the *Dendropanax morbifera* Lev. that is ten or more years old, followed by storage at a low temperature of 2 to 5° C. for 20 to 40 days in the step (a).

13. The method of manufacturing the kimchi according to claim 4, wherein the garlic and the ginger included in the first kimchi-filling-manufacturing step of the step (d) are added in a form of a *Dendropanax-morbifera*-Lev.-garlic-fermentation solution and a *Dendropanax-morbifera*-Lev.-ginger-fermentation solution, the *Dendropanax-morbifera*-Lev.-garlic-fermentation solution manufactured by mixing the garlic with the *Dendropanax-morbifera*-Lev.-extract solution manufactured in the step (a), the *Dendropanax-morbifera*-Lev.-ginger-fermentation solution manufactured by mixing the ginger with the *Dendropanax-morbifera*-Lev.-extract solution manufactured in the step (a), and
a Japanese-apricot-fermentation solution is added in a form of a *Dendropanax-morbifera*-Lev.-Japanese-apricot-fermentation solution manufactured by mixing the Japanese-apricot-fermentation solution with the *Dendropanax-morbifera*-Lev.-extract solution manufactured in the step (a).

14. The method of manufacturing the kimchi according to claim 1, wherein the *Dendropanax-morbifera*-Lev.-fermentation solution manufactured using the method is used while being mixed with the *Dendropanax-morbifera*-Lev.-extract solution at a ratio of 1:9 to 9:1.

\* \* \* \* \*